(12) United States Patent
Bayer et al.

(10) Patent No.: US 11,981,413 B2
(45) Date of Patent: May 14, 2024

(54) MULTILAYERED MATERIAL

(71) Applicant: FONDAZIONE ISTITUTO ITALIANO DI TECNOLOGIA, Genoa (IT)

(72) Inventors: Ilker Bayer, Genoa (IT); Gabriele Nanni, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 530 days.

(21) Appl. No.: 17/278,108

(22) PCT Filed: Sep. 20, 2019

(86) PCT No.: PCT/IB2019/057984
§ 371 (c)(1),
(2) Date: Mar. 19, 2021

(87) PCT Pub. No.: WO2020/065479
PCT Pub. Date: Apr. 2, 2020

(65) Prior Publication Data
US 2021/0347457 A1    Nov. 11, 2021

(30) Foreign Application Priority Data
Sep. 24, 2018    (IT) .................. 102018000008877

(51) Int. Cl.
*B63H 9/067* (2020.01)
*C08J 5/12* (2006.01)

(52) U.S. Cl.
CPC ............. *B63H 9/067* (2020.02); *C08J 5/127* (2013.01); *C08J 2367/00* (2013.01); *C08J 2375/04* (2013.01); *C08J 2475/04* (2013.01); *C08J 2477/10* (2013.01)

(58) Field of Classification Search
None
See application file for complete search history.

(56) References Cited

U.S. PATENT DOCUMENTS

| 6,971,430 B1 * | 12/2005 | Omohundro ........... B63H 9/067 |
| | | 156/437 |
| 2011/0214595 A1 | 9/2011 | Kiss |
| 2017/0022658 A1 * | 1/2017 | Fang .................... D06N 3/0034 |
| 2019/0009508 A1 * | 1/2019 | Schaefer ............... B32B 37/025 |

FOREIGN PATENT DOCUMENTS

| WO | 94/11185 A1 | 5/1994 |
| WO | 2008/142725 A2 | 11/2008 |

OTHER PUBLICATIONS

International Search Report and Written Opinion for Corresponding International Application No. (PCT/IB2019/057984 (9 Pages) (dated Dec. 19, 2019).

* cited by examiner

*Primary Examiner* — Jeffrey D Washville
(74) *Attorney, Agent, or Firm* — Lucas & Mercanti, LLP

(57) ABSTRACT

The present invention refers to a new multilayered material, reinforced with fibres and having an improved adhesion between the layers throughout its entire structure; to a process for its preparation and to the articles made with such material, intended to be exposed to adverse conditions, such as strong winds, stretching, temperature changes, such as for example sails for boat.

17 Claims, 4 Drawing Sheets

(State of the Art)

MULTILAYERED MATERIAL

CROSS-REFERENCE TO RELATED APPLICATIONS

This application is a 371 of PCT/IB2019/057984, filed Sep. 20, 2019, which claims the benefit of Italian Patent Application No. 102018000008877, filed Sep. 24, 2018.

FIELD OF THE INVENTION

The present invention refers in general to the field of engineered materials, and more precisely it concerns a newly improved multilayered material, a process for its preparation and the articles made with such material that are articles intended to be exposed to adverse conditions, such as strong winds, stretching, temperature changes, such as sails for boats.

STATE OF THE ART

In recent years there have been noticeable changes in the field of pleasure boating and even more among racing boats as regard the materials with which the sails are made. The natural canvas of traditional sails has in fact been completely replaced by synthetic materials, which are lighter and more durable, as well as less deformable when the sail is under stress, thus ensuring better performance for the boat.

To date there are two main categories of materials for sails: woven polyesters and laminates. Although both of these categories of materials serve the same purpose of making sails lighter and more resistant to stretching, and must also compete for costs, the laminates and the fabrics differ considerably in appearance, manufacturing procedure, components and performance.

Woven synthetic materials are made by weaving fibres in a regular manner, on a loom, as in the traditional fabric manufacturing. A sail made of woven polyester can last up to about 10 years, although its shape and performance meanwhile have been greatly deteriorated. The performance of a fabric sail depends on the following factors:
- weft compactness;
- quality of the fibre, in particular its shrinkage capability when subjected to heat and pressure during the finishing;
- the quality and properties of the coatings used in the finishing.

The laminates are instead multilayered systems made with self-adhesive plastic films, i.e. extruded plastic sheets, generally transparent, with an acrylic-based coating on one side, combined with reinforcing fibres with high mechanical resistance, impregnated with a resin. In a sail, plastic films allow the single fibres to be placed on continuous straight paths. The fibres provide mechanical strength and resistance to stretching along the main load directions, while plastic films minimize stretching in all the other directions. The laminates are made by applying an external pressure using a pressing roller. If heat is also required to cure the adhesive, it is supplied by using heating lamps. Generally, laminates tend to deteriorate when approaching their end of life due to the action of UV rays and the bending of the material which, in the long run, cause delamination and breakage. The performance of the laminates depends on the following factors:
- the way in which the fibres, the film, and the adhesive are combined to make the sail;
- the amount and quality of the adhesive.

The laminates suitable for use in making boat sails that are currently on the market generally consist of two films of polyester interspersed with an intermediate layer of an adhesive for lamination in which there are also reinforcing fibres, constituted for example by Kevlar®, carbon, Technora, Twaron, Black Polyester 1200-1800 dTex, or the like. The laminate is made by exerting a pressure of 0.5-1 MPa, generally exerted with a lamination cylinder and subjecting the material to heating cycles at 115-150° C. FIG. 1 annexed herein schematically shows a sectional view of one of these laminates of the state of the art.

Several multilayered materials of this type are currently on the market and most of them are proposed precisely to make high-performance laminates for boat sails. An example of such materials useful in boat sails is described in the international patent application published under the No. WO 2008/142725A2 directed to a method and a plant for the production of flexible membranes, with panels reinforced by wires through a series of steps of bonding, thermal activation and application of a pressure.

Also the U.S. patent application published under the No. US 2011/0214595A1 describes a similar multilayered material, with two layers of polymeric material and an adhesive layer in between that can be activated by temperature, wherein the fibres are also arranged and placed according to predetermined load orientations; this multilayer is then placed under vacuum and subjected to a heat treatment and application of a pressure in order to activate the adhesive layer and minimize the amount of empty gaps in the material between the first and the second layer.

The success of these composite materials must obviously be based on the good adhesion between the different layers that constitute the laminate; without a sufficient adhesion, the layers will delaminate with use and will no longer be able to perform the required function. The lack of adhesion can arise from local imperfections or deformities such as air bubbles at the interface between the layers of the laminate, therefore to obtain an effective adhesive interface one of the requirements is the absence of air bubbles. Furthermore, the lamination works well if the concentration and the orientation of the reinforcing fibres are uniform in the multilayer. However, in multilayered materials the thicknesses of the laminate are never uniform; the fibres are generally aligned with the expected load lines and go in multiple directions, crossing each other. Furthermore, in the areas of the multilayer that are more subject to stress, a higher concentration of reinforcing fibres is required. When the laminate is prepared by passing the lamination roller on the multilayer, this fails to force the layers completely and make them penetrate into the gaps left free around the fibres, therefore empty gaps always remain in the laminate.

The international patent application published under the No. WO 94/11185 describes a flexible, reinforced laminate for the manufacture of boat sails.

The problem of providing multilayered polymeric materials laminated and reinforced with fibres, which are durable and resistant in particular to the phenomenon of delamination of the layers with use, is still very much felt.

SUMMARY OF THE INVENTION

The present invention therefore sets out to provide a novel multilayered polymeric material, improved in particular in its resistance to detachment and delamination.

A particular subject of the present invention is to provide such a reinforced material in which the polymeric materials conform strictly to the fibres, without leaving air bubbles or empty gaps in the structure, which represent, as seen above, points of fragility of the material with respect to the delamination of the layers.

Still a particular subject of the present invention is to provide a process for the preparation of the aforesaid material, which is simple and with low energy consumption.

Still a further subject of the present invention is to provide articles, in particular sails for boats, made with or comprising the aforesaid material.

These and other subjects are achieved by the multilayered material according to the invention, whose essential characteristics are defined by claim 1 annexed herein; by the process for its preparation, and by the articles comprising it, whose essential characteristics are defined in the claims 8 and 11 annexed herein.

Further important characteristics of the multilayered material, of the preparation process, and of the related articles according to the present invention are defined in the dependent claims appended herein, and will become clearer from the following description of embodiments made by way of non-limiting example with reference to the appended figures.

DETAILED DESCRIPTION OF THE INVENTION

Figure 1:
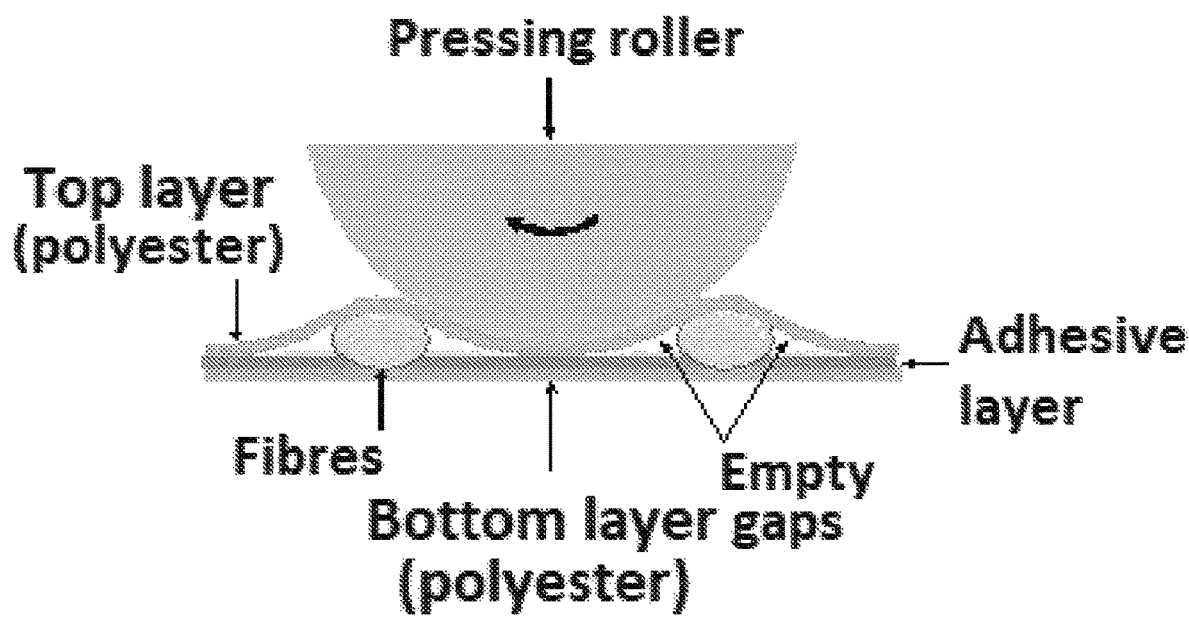
FIG. 1: schematically illustrates a sectional view of a laminate of the state of the art.
Figure 2:
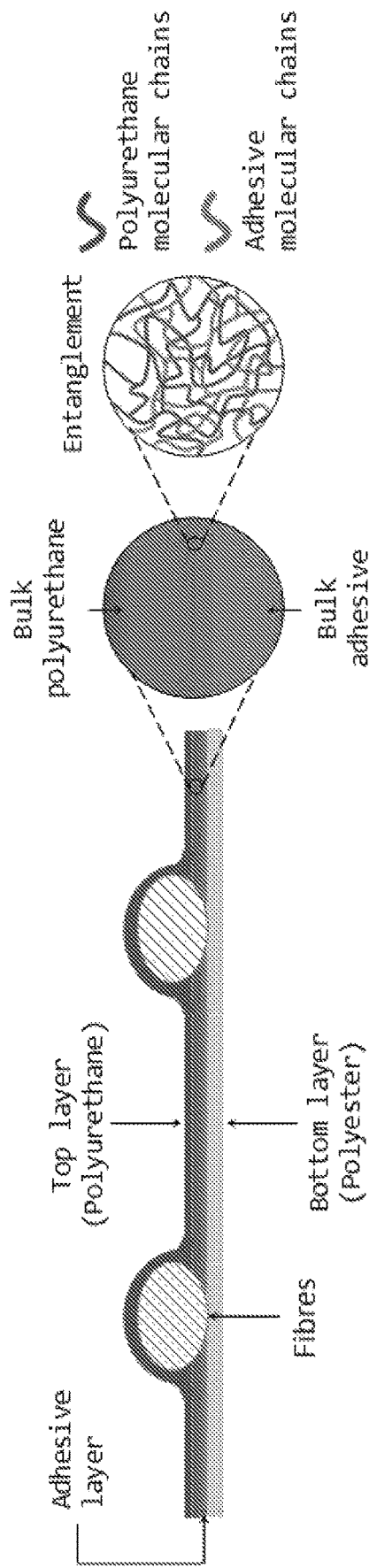
FIG. 2: schematically illustrates a sectional view of a multilayered material of the invention in a preferred embodiment.

The multilayered material of the invention is a flexible material comprising at least two polymeric layers, the first layer comprises a thermoplastic polymer film, having a surface thereof coated by an adhesive on which fibres of one or more materials having high elastic modulus are placed, such as, for example, aramid fibres or carbon fibres, and the second layer comprises polyurethane obtained as better illustrated below.

The first thermoplastic polymer layer constitutes a sort of support or base on which an adhesive is placed, preferably a pressure-sensitive lamination adhesive, selected for example among acrylic adhesives, with various degrees of adhesion typically comprised between 1 and 12 N/2.5 cm. As an adhesive according to this invention, a solvent-based, water-based or solvent-free adhesive can be used.

The thermoplastic polymer which constitutes the first layer is preferably a polyester, such as the commercial product Mylar®.

The reinforcing fibres are arranged on the adhesive according to predetermined load lines, which are those expected for the material. In one aspect, the reinforcing fibres are placed on the adhesive so as to form continuous lines of fibres along these expected load lines, thereby increasing the effectiveness of the reinforcement they produce.

In the material of this invention, the second polymeric layer is a layer of polyurethane obtainable by deposition on the adhesive of an aqueous dispersion comprising polyurethane and subsequent curing in situ. This aqueous dispersion is for example prepared from polyester- or polyether-based polyols and polyisocyanates, preferably diisocyanates, as crosslinking agents. In a preferred embodiment of this invention, the crosslinking agents are selected from the aliphatic diisocyanates.

According to a preferred embodiment of this invention, the dispersion comprising polyurethane, and therefore the second polymeric layer in the multilayered material, also comprises graphene nanoplatelets. In fact, it has been observed in experiments that the addition of graphene nanoplatelets to polyurethane significantly increases the elastic modulus of the resulting material, further improving the characteristics of the present multilayered material.

In addition to, or as an alternative to graphene, the aqueous dispersion of polyurethane may further comprise one or more among pigments, reinforcing particles or fibres, which may be the same as or different from those present in the adhesive, UV stabilizers, agents with electrical or magnetic properties, and any other desired additives, including those sensitive to high temperatures. Such additives can be present, for example, in the aqueous dispersion of polyurethane in an amount comprised between 1 and 50% by weight with respect to the weight of the polyurethane in the dispersion. In fact, as illustrated below, the present material can be prepared without carrying out lamination at high temperatures, so that also additives sensitive to high temperatures can be added in the dispersion without incurring any processing problem.

The thickness of the multilayered material of the invention can be modulated in a wide range, typically comprised between 1 and 100 µm.

The multilayered material of the invention is prepared with a process, also subject of this invention, which comprises the steps of:
 i) providing a first layer of thermoplastic polymer film, preferably polyester as described above;
 ii) applying an adhesive, preferably a pressure-sensitive lamination adhesive, on a surface of the first layer;
 iii) placing on the adhesive a plurality of fibres of one or more materials with high elastic modulus with a predetermined orientation to form continuous paths along expected load lines for the multilayered material;
 iv) applying on the adhesive an aqueous dispersion comprising polyurethane;
 v) curing in situ of the aqueous dispersion applied on the adhesive.

The step ii) of application of the adhesive can for example be carried out by applying a flow of hot air or by heating with IR or UV lamps.

Preferably, the aqueous dispersion comprising polyurethane further comprises from 1% to 90% by volume of an organic solvent, such as for example acetone or an alcohol, selected in particular from ethanol, methanol and isopropanol. The organic solvent can cause, with a phenomenon of the polymers known as swelling, the swelling of the adhesive layer on which the aqueous dispersion comprising polyurethane is deposited, so facilitating the interpenetration of the polymeric chains between polyurethane and adhesive.

In one aspect of the present process, step v) of curing at room temperature can be followed by a heating stage at a temperature of about 60° C., for the purpose of completing the evaporation of the residual water.

According to a particularly preferred embodiment of the invention, the process is carried out by applying the aqueous dispersion of polyurethane on the adhesive by spray coating. This in fact makes it possible to uniformly apply the layer of polyurethane, also easily modulating its thickness. In this phase, which is carried out at room temperature, the polymers are cured in situ, with a mixing of the molecular chains of the adhesive and of the polyurethane so as to form a second layer well cohesive with the first one and without leaving any empty gaps around the fibres which, as explained above, might be the origin of the delamination phenomenon in the final multilayer. The second polyurethane layer is finally perfectly interpenetrated in the adhesive, without a separation surface that delimits the outline of the two different materials, as instead would be obtained by carrying out a deposition of a preformed film of polyurethane on the adhesive. The durability of the multilayered material of the invention and its resistance to delamination are considerably improved with respect to the laminates of the prior art.

In a preferred embodiment, the step of spraying the dispersion of polyurethane in the present process is automated with the main parameters, such as the distance between the surface of the adhesive and the head of the spraying gun, the shape and dimensions of the spraying nozzle, the amount of sprayed material, etc., adjustable by a control unit.

A main advantage of this invention lies in the fact that the formation of the polyurethane layer is obtained by applying an aqueous dispersion, which is allowed to crosslink in situ on the adhesive, and this allows obtaining a tight mixing between polyurethane and adhesive containing the reinforcing fibres, so that no empty gaps remain around the reinforcing fibres in the final material and this will be less prone to delamination.

A further advantage of the present process is that it can be carried out at room temperature, or in any case at low temperatures. This ensures that the polyurethane dispersion can be added with the most various products, including those sensitive to high temperatures.

Yet a further advantage of the present process lies in the fact that it is a simple process, which does not envisage expensive reagents, machinery or procedures and can be modulated according to the aesthetic or functional requirements that the final material must have.

The multilayered material of the present invention is particularly suitable for making sails for boats, or at least parts thereof, but can be advantageously used to make or coat other types of articles, also comprised in this invention, such as for example clothing or more in general, protective items for workers, tents, bags and duffle bags, sporting articles and equipment.

The following experimental examples are provided in an illustrative and non-limiting way of the present invention.

Example 1—Preparation of the Multilayered Material of the Invention

A Mylar® polyester film (75 Gauge, produced by DuPont Teijin Films) was provided having a surface coated with a pressure-sensitive acrylic adhesive for a thickness of 65 µm, and an internal x-ply reinforcement structure.

A mixture was then prepared with acetone, graphene nanoplatelets having a lateral dimension of about 700 nm and thickness>20 atomic layers, and an aqueous dispersion of polyurethane (ICO-THANE BF 10) according to the following procedure. A dispersion of the graphene nanoplatelets in acetone was first prepared, subjected to ultrasonication for 1 hour, then added to the aqueous dispersion of polyurethane. In the preparation of this mixture a weight ratio between acetone and aqueous dispersion of polyurethane equal to 100:30 was used, and a weight ratio of 100:5 between the dry weight of polyurethane in its aqueous dispersion and the graphene nanoplatelets.

The resulting acetone/graphene/polyurethane mixture was manually deposited on the adhesive side of the Mylar® polyester film by using a compressed air spray gun. This spray gun was held about 15-25 cm from the adhesive layer, and moved back and forth on the surface so that each movement overlapped the previous one so as to ensure a continuous coating of the surface. The wet coating was allowed to dry at room temperature, then it was subjected to heating at 60° C. with a flow of hot air to facilitate the complete evaporation of the residual water.

After drying, a flexible, dry-to-touch polymeric film with a thickness of 20 µm was formed. This multilayered film was used to manufacture a boat sail, which showed excellent mechanical performance and resistance to delamination under atmospheric conditions of high humidity and wind, and it was also subjected to the tests and characterizations described below.

Example 2 (Comparison)—Preparation of a Multilayered Material of the Prior Art A multilayered material according to the prior art was prepared with two layers of Mylar® polyester film (75 gauge, produced by DuPont Teijin Films) having a thickness of 19 mm, interspersed with an adhesive film for T-Bond lamination, 50 µm thick, and reinforcing fibres constituted by Twaron® (produced by Teijin Aramid). This multilayer was subjected to lamination by applying a pressure of about 1.2 MPa with a vacuum process and a pressing roller and a heating cycle in a temperature range comprised between 120° C. and 160° C.

Example 3—Characterization of the Material and Resistance Test

Figure 3:
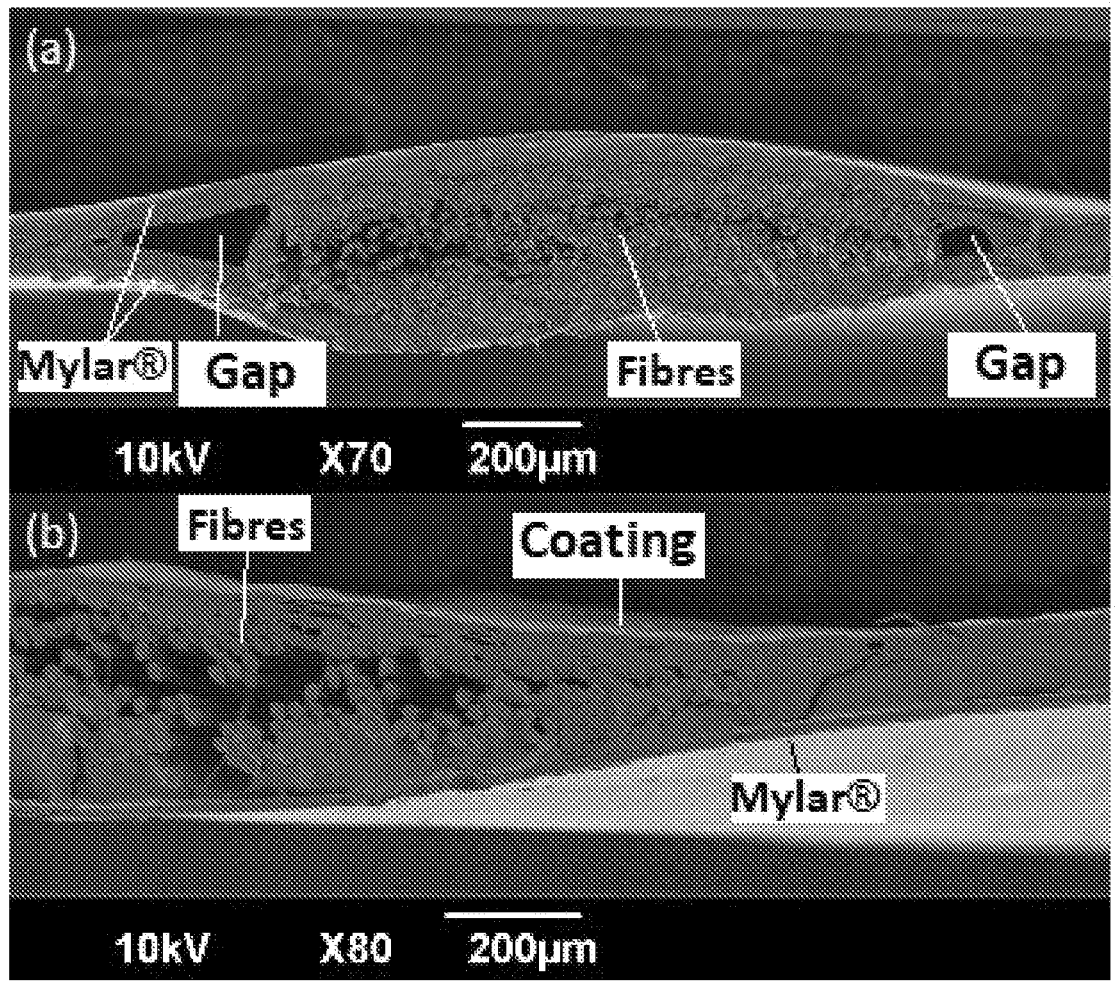
FIG. 3: shows the SEM images (a) and (b) of the sectional views of a prior art laminate prepared according to Example 2 and of a multilayered material of the invention prepared according to Example 1, respectively.

A sample of the material of the invention prepared as described above in Example 1 was subjected to analysis of the microscopic structure of the multilayer by means of scanning electron microscopy (Scanning Electron Microscopy, SEM), in parallel with a sample of the prior art, used for comparison and prepared as described above in Example 2, so as to compare the quality of the adhesion of the interface in the multilayer of the prior art and in that of the invention. FIG. 3 shows the SEM images of the sectional view of the interfaces in the laminate of the prior art (a) and in the multilayer of the invention (b). This analysis has highlighted the presence of empty gaps in the laminate of the prior art. At these gaps, there is an interruption of the adhesive interfaces even after the high pressure and temperature cycles to which the multilayer is subjected. These empty gaps are responsible for the formation of the breakages along the interface between the outer plastic film and the adhesive layer. On the contrary, in the multilayer of the invention a good compatibility between the different materials is shown, without any interruption of the adhesive interface, suggesting a final product with improved resistance to delamination.

Figure 4:
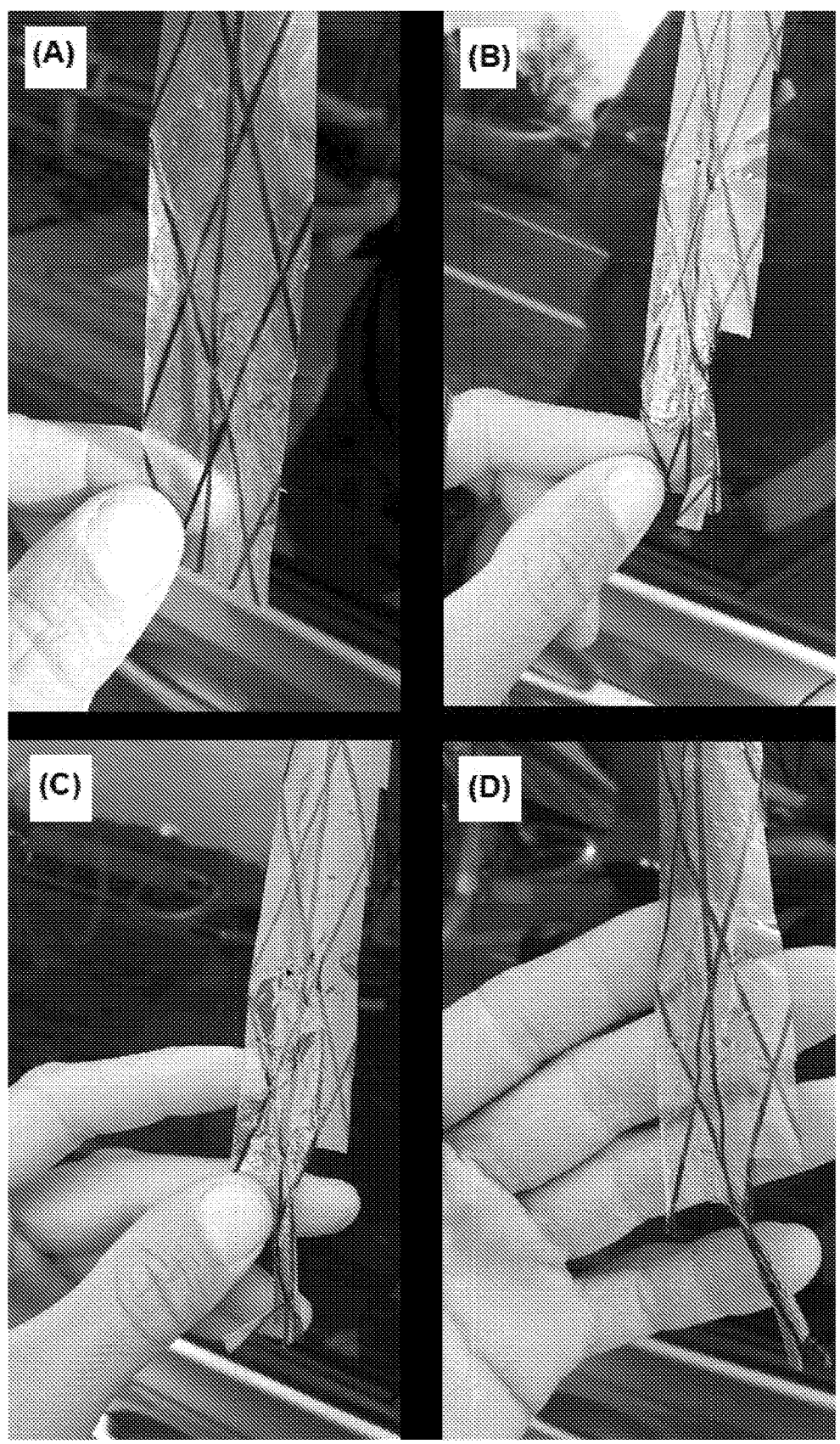
FIG. 4: shows the photographs (A), (B), (C) and (D) taken of a sample of the material of the invention at four different times in the test, in order to try its resistance to delamination, described below in Example 3.

The multilayer of this invention has also been subjected to an operational test to further test the increased adhesion force of the layers in the material, a test in which continuous conditions of very strong wind were simulated. In detail, a sample of material prepared as described above in Example 1 was fixed outside the window of a vehicle that then travelled 150 km on the motorway. The sample had been fixed to the vehicle so that it could flutter freely during the race, which was done at an almost constant speed of the vehicle between 110 and 120 Km/h. FIG. 4 shows the pictures of this sample of material of the invention taken after 20 Km (A), after 66 Km (B), after 100 Km (C) and at the end of the race, after 150 Km (D). As shown, the forces to which the sample was subjected by the wind tore it apart but there was no sign of delamination of the multilayer, even after 150 Km.

The invention claimed is:

1. A flexible multilayered material comprising:
   at least two polymeric layers, a first of said layers comprising a film of a thermoplastic polymer, having a surface thereof coated by an adhesive, on which fibres of one or more materials having high elastic modulus are placed according to predetermined load lines of said multilayered material,
   wherein a second of said polymeric layers being a polyurethane layer obtainable by deposition on said adhesive of an aqueous dispersion comprising polyurethane and by curing said aqueous dispersion comprising polyurethane in situ to form a cured polyurethane layer, wherein said adhesive and said cured polyurethane layer interpenetrate each other thereby avoiding a separation surface delimiting an outline between said adhesive and said cured polyurethane layer.

2. The multilayered material according to claim 1, wherein said second polyurethane layer further comprises one or more pigments, reinforcing particles or fibres and UV stabilizers.

3. The multilayered material according to claim 1, wherein said second polyurethane layer further comprises graphene nanoplatelets.

4. The multilayered material according to claim 1, wherein said thermoplastic polymer is a polyester.

5. The multilayered material according to claim 1, wherein said adhesive is a lamination adhesive.

6. The multilayered material according to claim 1, wherein said fibres are carbon fibres and/or aramid fibres.

7. The multilayered material according to claim 1, wherein said aqueous dispersion comprising polyurethane is an aqueous dispersion obtained by dispersion in water of a polyol selected from polyether- or polyester-polyols and a diisocyanate.

8. A process for the preparation of a multilayered material of the claim 1, comprising the steps of:

i) providing a first layer of a thermoplastic polymer film;
   ii) applying an adhesive on a surface of said first layer;
   iii) placing on said adhesive a plurality of fibres of one or more materials having high elastic modulus with a predetermined orientation to form continuous paths along expected load lines for said multilayered material;
   iv) applying on said adhesive an aqueous dispersion comprising polyurethane; and
   v) curing, in situ, said aqueous dispersion applied on the adhesive to form a cured polyurethane layer,
   wherein said adhesive and said cured polyurethane layer interpenetrate each other thereby avoiding a separation surface delimiting an outline between said adhesive and said cured polyurethane layer.

9. The process according to claim 8, wherein said aqueous dispersion comprising polyurethane is applied in step iv) by spray coating.

10. The process according to claim 8, wherein said aqueous dispersion comprising polyurethane further comprises an organic solvent and optionally one or more among pigments, reinforcing particles or fibres and UV stabilizers.

11. An article manufactured with or comprising a multilayered material of claim 1.

12. The article according to claim 11, which is a sail for boats.

13. The multilayered material according to claim 4, wherein said polyester is in mixture with other polyesters or with other polymers.

14. The multilayered material according to claim 4, wherein said lamination adhesive is a pressure-sensitive adhesive.

15. The multilayered material according to claim 7, wherein said diisocyanate is an aliphatic diisocyanate.

16. The multilayered material according to claim 1, wherein said encased fibres have a length and first and second lateral ends defining a width of said encased fibres, and wherein said cured polyurethane layer omits empty gaps at said first and second lateral ends.

17. The process according to claim 8, wherein said encased fibres have a length and first and second lateral ends defining a width of said encased fibres, and wherein said cured polyurethane layers omits empty gaps at said first and second lateral ends.

* * * * *